(12) United States Patent
Hayashi et al.

(10) Patent No.: US 7,122,946 B2
(45) Date of Patent: Oct. 17, 2006

(54) LIGHT SOURCE DEVICE HAVING HIGH LIMIT-EMITTING EFFICIENCY

(75) Inventors: Keiji Hayashi, Kawasaki (JP); Tetsuya Kobayashi, Kawasaki (JP); Toshihiro Suzuki, Kawasaki (JP); Tetsuya Hamada, Kawasaki (JP); Mari Sugawara, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 179 days.

(21) Appl. No.: 10/652,831

(22) Filed: Aug. 29, 2003

(65) Prior Publication Data
US 2004/0051429 A1    Mar. 18, 2004

(30) Foreign Application Priority Data
Aug. 30, 2002 (JP) .............................. 2002-255669

(51) Int. Cl.
  *H01J 61/52* (2006.01)
(52) U.S. Cl. .............................. 313/46; 313/35; 313/44
(58) Field of Classification Search .................. 313/11, 313/34, 39, 40, 44, 45, 46; 362/218, 294
See application file for complete search history.

(56) References Cited
U.S. PATENT DOCUMENTS
3,974,418 A * 8/1976 Fridrich ........................ 315/59
5,791,770 A * 8/1998 Hoyt et al. .................. 362/294
5,801,493 A * 9/1998 Antonis et al. ............. 315/248
5,808,418 A * 9/1998 Pitman et al. ............... 315/115

FOREIGN PATENT DOCUMENTS
JP          7-111146        4/1995
JP          9-17377         1/1997
JP          9-306431       11/1997
JP          2003-100130     4/2003

* cited by examiner

Primary Examiner—Nimeshkumar D. Patel
Assistant Examiner—Matt Hodges
(74) Attorney, Agent, or Firm—Greer, Burns & Crain, Ltd.

(57) ABSTRACT

There is provided a light source device, used in a display device and the like, having a high light emitting efficiency. The light source device has an electric discharge tube containing mercury and electrodes at both ends. A heat conducting member is attached to and is in contact with a part of the electric discharge tube. The heat conducting member locally cools the tube. The heat conducting member and the tube satisfy the following relationship, $6\times10^{-5}$ $(m^2 \cdot k)/S < (1/k1 - 1/k2)W$, where a cross sectional area of the electric discharge tube is S ($m^2$), an amount of generate heat per unit length of the electric discharge tubes is W (W/m), heat conductivity of the non-cooling part is k1 (W/K/m), and heat conductivity of the cooling part is defined as k2 (W/K/m).

7 Claims, 9 Drawing Sheets

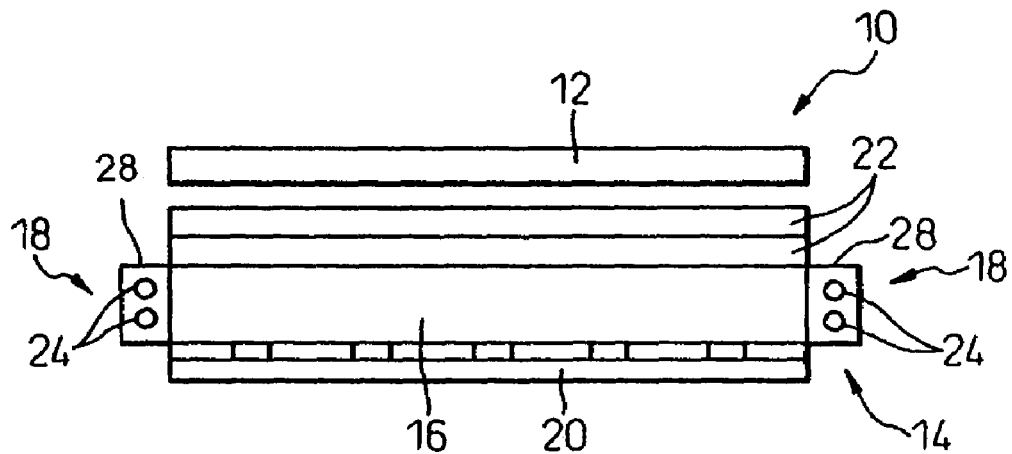
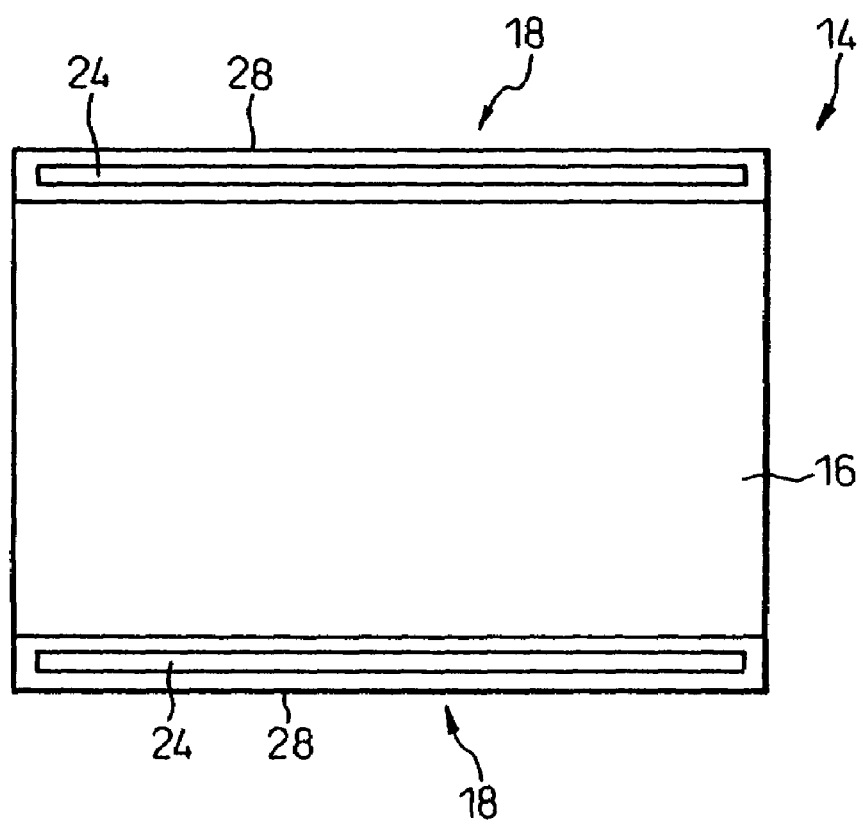

LIGHT SOURCE DEVICE HAVING HIGH LIMIT-EMITTING EFFICIENCY

BACKGROUND OF THE INVENTION

1. Field of the Invention

The present invention relates to a light source device including an electric discharge tube that emits light by discharging electricity in a gas. In particular, the present invention relates to a light source device including an electric discharge tube comprising a cold-cathode tube using mercury as a discharge gas.

2. Description of the Related Art

A liquid crystal display device includes a backlight using an electric discharge tube comprising a cold-cathode tube, as a light source, for example. In the electric discharge tube, mercury is used as a light-emitting material. The mercury exists in the electric discharge tube in both liquid and gaseous states. The amount of the filled mercury is far (about 1,000 times) larger than the amount of vapor mercury that provides the maximum light emitting efficiency. In such an electric discharge tube, the maximum light emitting efficiency can be obtained when the electric discharge tube is at a predetermined temperature. However, if a large amount of electric power is supplied to the electric discharge tube, the temperature in the electric discharge tube rises so as to increase the mercury vapor pressure too much and to reduce the light emitting efficiency.

In Japanese Unexamined Patent Publication (Kokai) No. 2003-100130, that is the prior application of the present application, in order to prevent this phenomenon from reducing the efficiency, a technique has been proposed to provide a heat conducting path (a heat conducting material) that is in contact with the electric discharge tube so that heat is transferred from the electric discharge tube via the heat conducting path to cool the electric discharge tube. By providing such a heat conducting path, the liquid mercury is concentrated at the cooling part of the electric discharge tube that is in contact with the heat conducting path so that the mercury vapor pressure in the electric discharge tubes corresponds to the temperature of the cooled part of the electric discharge tube, which results in the maximum light emitting efficiency.

It is desirable that the liquid mercury is situated at the cooling part of the electric discharge tube that is in contact with the heat conducting path in a concentrated manner. However, the liquid mercury is distributed randomly in the tube before use and it concentrates at the cooling part gradually during use. Therefore, it is desirable to perform a procedure to concentrate or collect the liquid mercury at the cooling part in advance and before use.

In the prior art, there have been the following problems:

(a) if the process to concentrate the liquid mercury at specific positions is needed when the electric discharge tubes are manufactured, the cost may be increased;

(b) when droplets of the liquid mercury are displaced from the cooling part, due to impact, and the like, the light emitting efficiency may be reduced;

(c) conventionally, a heat conducting silicon rubber material (heat conductivity 1 to 2 W/K/m) or an aluminum plate is used as the heat conducting path. In both materials, the heat conductivity hardly depends on the temperature. Therefore, because the magnitude of temperature rise of the electric discharge tube, that is exposed to the ambient temperature, is always proportional to the heating value of the electric discharge tube, as the ambient temperature rises, the surface temperature of the electric discharge tubes varies proportionally and, as a result, the temperature inside the electric discharge tube cannot be maintained at an optimal value; and (d) if the heat conducting path is large and dark in color, it may cast a shadow when it is incorporated as the backlight.

SUMMARY OF THE INVENTION

Thus, it is an object of the present invention to provide a light source device that is simple and has high light emitting efficiency.

The invention set forth in the following is intended to solve at least one of these problems.

According to an aspect of the present invention, there is provided a light source device comprising: an electric discharge tube containing mercury therein and having electrodes at both ends thereof; and a heat conducting path in contact with a part of the electric discharge tube, wherein the following relationship is substantially satisfied:

$$6\times 10^{-5}(m^2\cdot k)/S < (1/k1-1/k2)W \quad (1)$$

where a part of the electric discharge tube in contact with the heat conducting path is defined as a cooling part, a part of the electric discharge tube not in contact with the heat conducting path is defined as a non-cooling part, a cross sectional area of the interior of the electric discharge tube is defined as S ($m^2$), an amount of a generated heat per unit length of the electric discharge tube is defined as W (W/m), heat conductivity from inside to outside of the tubes per unit length in the longitudinal direction of the non-cooling part is defined as k1 (W/K/m), and heat conductivity from inside to outside of the tubes per unit length in the longitudinal direction of the cooling part is defined as k2 (W/K/m).

Further, according to an aspect of the present invention, there is provided a light source device comprising: at least one electric discharge tube; a heat conducting path; and a heat radiator, wherein the electric discharge tube is filled with a solid or liquid light emitting material which vaporizes when the electric discharge tube is energized, the heat conducting path is made of a material or a structure having heat conductivity that increases as ambient temperature rises, and the one end of the heat conducting path is in contact with a part of a wall, of the electric discharge tube and the other end of the heat conducting path is disposed in contact with the radiator.

Still further, according to an aspect of the present invention, there is provided a light source device comprising: at least one electric discharge tube; a heat conducting path; and a heat radiator, wherein the electric discharge tube is filled with a solid or liquid light emitting material which vaporizes when the electric discharge tube is energized, the heat conducting path is a transparent body or it has a white, light-colored or reflecting surface, and wherein the one end of the heat conducting path is in contact with a part of a wall of the electric discharge tube and the other end of the heat conducting path is disposed in contact with the heat radiator.

Still further, according to an aspect of the present invention, there is provided a light source device comprising a plurality of light source assemblies, each of which includes at least one electric discharge tube, a heat conducting path, and a heat radiator, wherein each electric discharge tube is filled with a solid or liquid light emitting material which vaporizes when the electric discharge tube is energized, each of the heat conducting paths is disposed with respect to the respective electric discharge tube so that one end of the heat conducting path is in contact with a surface of the electric discharge tube and the other end is not in contact with the electric discharge tube but in contact with the heat radiator, and wherein the heat conducting paths have different heat conductivity for every light source assemblies, and surface temperatures of the electric discharge tubes at parts in contact with the respective heat conducting paths in the respective light source assemblies remain substantially within a range of 5° C.

Still further, according to an aspect of the present invention, there is provided a light source device comprising: an electric discharge tube containing mercury therein; and a heat conducting path, wherein the electric discharge tube is made of a transparent material and has electrodes provided at both ends thereof, one end of the heat conducting path is in contact with a part of a wall of the electric discharge tubes within a light emitting portion, and a surface area s (m$^2$) of the electric discharge tube in the range where it is in contact with said heat conducting paths and an internal volume V (m$^3$) of the electric discharge tube satisfy the relationship of V/s<4.2 cm.

BRIEF DESCRIPTION OF THE DRAWINGS

FIG. 1 is a view showing a liquid crystal display device including a light source device of the present invention;

FIG. 2 is a cross-sectional view showing the backlight of FIG. 1;

DESCRIPTION OF THE PREFERRED EMBODIMENTS

Figure 3:
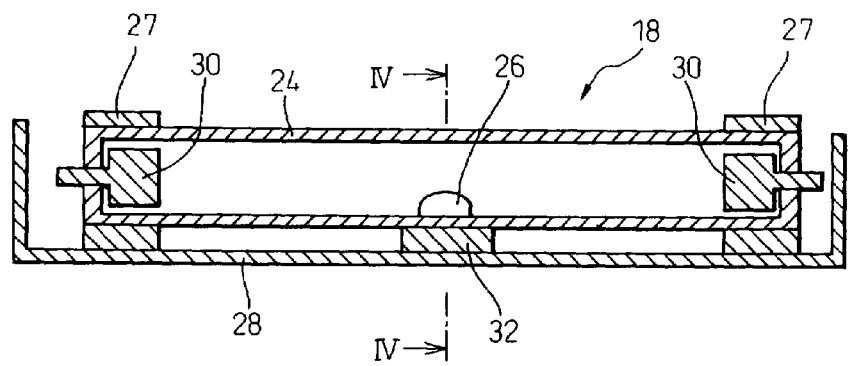
FIG. 3 is a view showing the electric discharge tube and the reflector of the light source device of FIG. 1.

The preferred embodiments of the present invention will be described with reference to the drawings. FIG. 1 is a view showing a liquid crystal display device including a backlight of the present invention, and FIG. 2 is a cross-sectional view showing the backlight of FIG. 1. In FIGS. 1 and 2, the liquid crystal display device 10 includes a liquid crystal panel 12 and a backlight 14. The backlight 14 in turn includes a light guide plate 16, light source devices 18 disposed on both sides of the light guide plate 16, a scatter reflection plate 20 disposed below the light guide plate 16, and scatter plates 22 disposed above the light guide plate 16.

Each the light source device 18 comprises two electric discharge tubes 24 and a reflector 28. A portion of the outgoing light from the electric discharge tubes 24 is made directly incident to the light guide plate 16 and the other portion of the outgoing light from the electric discharge tubes 24 is reflected by the reflector 28 and made incident to the light guide plate 16. The light travels through the light guide plate 16, is reflected by the scatter reflection plate 20 and, then goes out from the light guide plate 16 toward the liquid crystal display panel 12 and, is then scattered by the scatter plates 22 and made incident to the liquid crystal display panel 12. The liquid crystal panel 12 produces an image, and a viewer can see a bright image because the light supplied from the backlight 14 illuminates the image produced by the liquid crystal panel 12.

Figure 4:
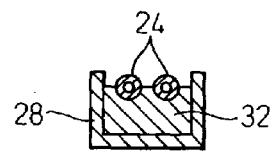
FIG. 4 is a cross-sectional view showing the electric discharge tube and the reflector, taken along the line IV—IV of FIG. 3.

FIG. 3 is a schematic cross-sectional view showing the light source device 18 of FIGS. 1 and 2. FIG. 4 is a cross-sectional view showing the light source device, taken along the line IV—IV of FIG. 3. In this embodiment, the electric discharge tube 24 is a cold-cathode tube that may also be referred to as a fluorescent lamp and has an inner diameter of 2.0 mm, an outer diameter of 2.6 mm and a length of 380 mm. Mercury 26 is filled in the electric discharge tube 24 and a fluorescent material is applied on the inner wall of the electric discharge tube 24. The reflector 28 is disposed so as to cover the two electric discharge tubes 24. Electrodes 30 are disposed at both ends of the electric discharge tube 24. The electric discharge tube 24 is held at the both ends thereof by the reflector 28 with holding members 27. The reflector 28 is attached to the housing of the backlight 14.

A heat conducting member (heat conducting path) 32 is attached to the reflector 28 and is in contact with the central part of the electric discharge tube 24. Therefore, the central part of the electric discharge tubes 24 is locally cooled by the heat conducting member 32. Here, a part of the electric discharge tube 24 that is in contact with the heat conducting member 32 is referred to as a "cooling part" and a part of the electric discharge tube 24 that is not in contact with the heat conducting member 32 is referred to as a "non-cooling part". As the reflector 28 is made of metal and has high heat conductivity and a high heat dissipation rate, the heat of the electric discharge tubes 24 is transferred to the reflector 28 via the heat conducting member 32 and, then exhausted from the reflector 28 to the outside.

The amount of the mercury 26 filled in the electric discharge tube 24 is considerably greater than the amount of the mercury necessary for electric discharge. Therefore, most of the mercury is in a liquid state and a small portion of the mercury is in a gaseous state. At the time of electric discharge, a portion of the liquid mercury is vaporized into a gaseous state and a portion of the gaseous mercury is liquefied into a liquid state. When a saturated vapor pressure in the electric discharge tube 24 takes an optimal value, the light emission brightness of the electric discharge tube 24 becomes a maximum and, on the other hand, the light emission brightness of the electric discharge tubes 24 is reduced when the saturated vapor pressure becomes larger or smaller than the optimal value. The saturated vapor pressure in the electric discharge tube 24 is a function of the temperature at the coldest part of the electric discharge tube 24. Therefore, the light emission brightness of the electric discharge tube 24 can be made maximum by providing the coldest part at a specific position of the electric discharge tube 24.

Figure 5:
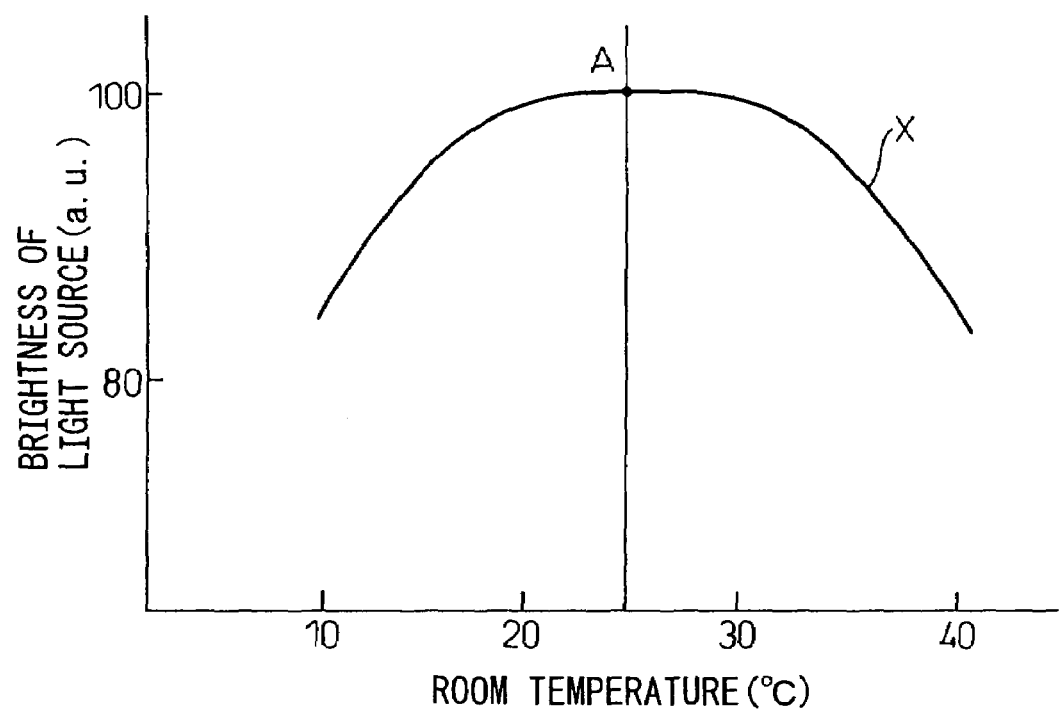
FIG. 5 is a view showing the relationship between the temperature and the brightness of an electric discharge tube.

FIG. 5 is a view showing the relationship between the temperature and the brightness of the electric discharge tube 24. The curve X represents a characteristic of the electric discharge tube 24 as shown in FIG. 3. The heat conducting member 32 is adapted so that, for example, the light emission brightness of the electric discharge tubes 24 takes the maximum value A when the room temperature is 25° C.

In FIG. 3, the liquid mercury is collected on the tube wall of the electric discharge tube 24 at the same position as the heat conducting member 32. Immediately after the electric discharge tube 24 is manufactured, the liquid mercury 26 is distributed over the entire area in the electric discharge tube 24 and it is not collected at any specific position. When the electric discharge tube 24 in this state is used, the liquid mercury 26 is collected at the specific positions where the heat conducting member 32 is disposed gradually as the backlight is used. However, a considerable time period may be required for the liquid mercury 26 to be collected at the specific positions naturally. If a sputtered material leaves the electrodes 30 and covers the surface of the liquid mercury droplets, the operational life of the electric discharge tube 24 may be shortened.

Therefore, with regard to the first and second objects, the problems discussed above can be solved by allowing the liquid mercury droplets to be moved to the cooling part and collected thereat within a predetermined time period even in the state where the mercury droplets are allowed to be located at any position other than the cooling position. This time limit may be determined according to how the mercury has been exhausted due to alloying with the sputtered materials. This condition can be expressed as follows:

The light source device comprises: an electric discharge tube having mercury filled therein and electrodes at both ends thereof; and a heat conducting path in contact with a part of the electric discharge tube, wherein the following relationship is substantially satisfied:

$$6 \times 10^{-5} (m^2 \cdot k)/S < (1/k1 - 1/k2)W \quad (1)$$

where a part of the electric discharge tube in contact with the heat conducting path is defined as a cooling part, a part of the electric discharge tube not in contact with the heat conducting path is defined as a non-cooling part, a cross sectional area of the interior of the electric discharge tube is defined as S ($m^2$), a quntity of generated heat per unit length of the electric discharge tube is defined as W (W/m), heat conductivity from inside to outside of the tubes per unit length in the longitudinal direction of the non-cooling part is defined as k1 (W/K/m), and heat conductivity from inside to outside of the tubes per unit length in the longitudinal direction of said cooling part is defined as k2 (W/K/m).

It can be translated into the following expression. Thus, the light source device comprises: an electric discharge tube having mercury filled therein and electrodes at both ends thereof; and a heat conducting path in contact with a part of the electric discharge tube, wherein the following relationship is substantially satisfied:

$$P(T2) < P(T1) - 6 \times 10^{-5}/S \quad (2)$$

where a part of the electric discharge tube in contact with the heat conducting path is defined as a cooled part, a part of the electric discharge tube not in contact with the heat conducting path is defined as a non-cooled part, a cross sectional area of the interior of the electric discharge tube is defined as S ($m^2$), a temperature of the outer surface of the electric discharge tube at least at a portion of a region that is apart from the electrodes by about 100 mm is T2 (K) at the time of energization of the electric discharge tube, the minimum surface temperature in a region, which is located between the electrodes at both ends and is different from the region where the surface temperature is T2 (K), is T1 (K), and a saturated vapor pressure of mercury at the temperature T is defined as P (T) (Pa).

Figure 6:
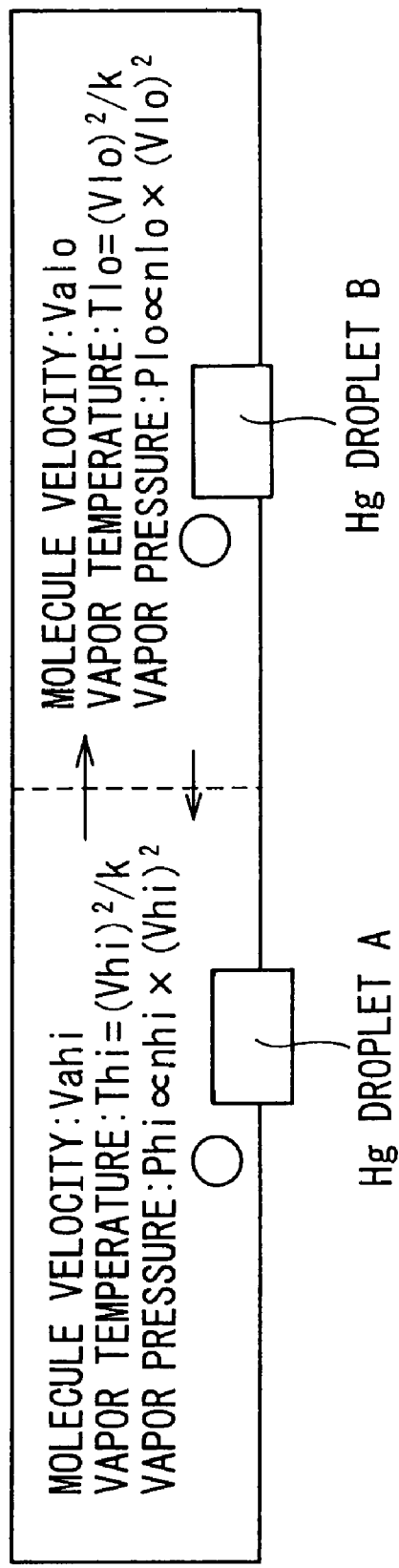
FIG. 6 is an explanatory view for explaining the principle of the present invention.

With reference to FIG. 6, in the vicinity of the mercury droplet, mercury vapor is produced at a saturated vapor pressure that corresponds to the temperature of that mercury droplet. When the mercury droplets are located at a plurality of positions and have different temperature values depending on the respective positions, the vapor pressure of the mercury droplets may also differ depending on the positions and, therefore, a pressure difference may be produced. As a result of the movement of mercury atoms due to the pressure difference, as described below, the mercury droplet vaporizes at a position of high temperature and the position of the mercury droplet is displaced to a position of low temperature accordingly.

The temperature T and the pressure P of the mercury vapor can be replaced by the velocity of the mercury atoms. (1) the velocity of the mercury atoms $va = (k \times T)^{0.5}$, and (2) the pressure due to collision of the mercury atoms $P \propto n \times mva$, where n is the number of the mercury atoms. The subscripts hi and lo indicate the high and low temperature positions, respectively.

The mercury droplet A has a temperature of Thi and the droplet B has a temperature of Tlo, the velocity of the mercury atoms in the mercury vapor in the vicinity of the respective mercury droplets may differ according to the temperatures of the respective mercury droplets. Under this condition, the mercury is moved from the region of the droplet A to the region of the droplet B. Its moving velocity is proportional to the difference of $n \times va$ ($nhi \times vahi - nlo \times valo$). Thus, the moving velocity is proportional to the difference between the vapor pressure Phi in the region where the mercury droplet A is located and the vapor pressure Plo in the region where the mercury droplet B is located (Therefore, a time period required for the mercury to be moved can be expressed in the form of the inequality (2)).

Further, as the number of the vaporized mercury atoms n is a function of the temperature T, it indirectly corresponds to the velocity of the atoms one to one. In the inequality (1), the moving velocity (n×difference of v) is expressed by first-order approximation of T (this approximation holds because the difference of temperature is on the order of 30° C.).

First, the velocity of the liquid mercury droplets gathering at the cooling part is estimated. In the light source device having a local cooling mechanism, a difference of the surface temperature of the electric discharge tube 24 between the cooled part and the non-cooled part is produced. The mercury is collected at the cooled part because the difference of the mercury vapor pressure is produced in the electric discharge tubes 24 due to the temperature difference and acts as a motive force. In the electric discharge tube 24 having a tube inner diameter of about 2.0 mm and a tube length of about 350 mm, when the temperature of the non-cooled part is 80° C. and the temperature of the cooling part is 60° C., all the filled mercury (3 mg or less) is typically collected at the cooling part after the electric discharge tube 24 is lit continuously for about 80 hours.

In order to achieve the temperature distribution described above on the tube wall, the heat radiating mechanism is required to satisfy the following conditions.

While the electric discharge tube 24 converts a portion of electric power supplied from outside into visible light, the remaining energy is converted into heat. About 80% of the electric energy is converted into heat, wherein about 20% of the total electric power is lost due to electric resistance of the electrodes and about 60% remains for generating heat in the discharge space. As the tube surface temperature of 80° C. in the discharge space corresponds to the state when 5–6 W of electric power is applied to the tube, the amount of heat that is emitted from the tube outer wall facing the discharge space (the tube extension of 350 mm and the inner diameter of 2.0 mm) is 0.08–0.1 W/cm. When the heat is emitted to the outside, in order to produce the temperature difference of 20° C. between the cooled part and the non-cooled part, the following relationship between the heat conductivity at the cooled part and the heat conductivity at the non-cooled part is required:

$$\text{Temperature difference} = (1/k_1 - 1/k_2) \times W \quad (3)$$

where, $k_1$ is the heat conductivity per unit length in the longitudinal direction of the tube from the inside to the outside at the non-cooling part;

$k_2$ is the heat conductivity per unit length in the longitudinal direction of the tube from the inside to the outside at the cooled part; and W is the amount of heat per unit length of the tube. Here, the heat conductivity depends on a coefficient of heat conduction and a shape of the heat conducting member.

Further, this phenomenon can be described in terms of diffusion of the mercury atoms.

From the mercury adhered to the wall, the mercury vapor of the amount corresponding to the saturated vapor pressure that is determined by the wall temperature T is vaporized. The pressure is proportional to the atom number density and the kinetic momentum per one atom, the number of mercury atoms passing through per unit time period is proportional to the partial pressure of mercury. Thus, the mercury vapor of the saturated vapor pressure at 80° C. (11.8 Pa) at the non-cooling part and of the saturated vapor pressure at 60° C. (3.35 Pa) at the cooling part is produced, respectively. Because the number of atoms passing through the cross section of the tube per unit time period is proportional to the difference of the mercury vapor pressure between two regions on either side of the cross section and the cross sectional area, it can be expressed by the following equation:

$$dn/dt = \alpha \times \pi \times (1 \times 10^{-3})^2 \times (11.8 - 3.35) \quad (4)$$

($\alpha$ is a proportional coefficient with regard to volume and quantity of filled gases other than mercury).

Considering the fact that the excessive mercury has completed its movement in 80 hours, in this condition, it is apparent that the velocity to allow the mercury complete its movement in 100 hours can be calculated by multiplying the right-hand side of the equation (4) by 0.8. Thus, it can be expressed by the following equation:

$$dn'/dt = 0.8 \times \alpha \times \pi \times (1 \times 10^{-3})^2 \times (11.8 - 3.35) \quad (5)$$

Further, considering the fact that the proportional coefficient $\alpha$ varies on the order of about 2 times depending on the pressure of the filled gases, the condition for the mercury vapor pressure in the tube can be provided as specified in the expression (2).

The difference of the tube surface temperature for producing such pressure difference corresponds to the case in which the temperature of the non-cooling part is about 75° C. while the suitable temperature of the mercury vapor in the tube having a radius of about 1–3 mm is 60° C. By substituting $3.1 \times 10^{-2}$ for the value of the tube internal cross sectional area S and by using the expression (3) that expresses the temperature difference produced on the tube surface, the relationship described above can be expressed as the expression (1).

More specifically, the expression (1) gives such a cooling condition that the mercury droplets are collected at the cooling part within 100 hours due to the temperature difference between the cooling part and the non-cooling part while the tube is continuously lit with the mercury droplets distributed over the entire tube.

The moving velocity of the mercury is proportional to the difference in the mercury gas concentration between the cooling part and the non-cooling part and is also proportional to the internal area of the tube. A fluorescent tube typically used in a large monitor has the internal diameter of about 2.0 mm and contains about 3 mg of mercury at the maximum. The lighting of the tube is begun with the mercury droplets dispersed at many portions in the tube, and the mercury moved to the cooling part due to the temperature difference. In the experiment, in the tube containing 2.1 to 2.3 mg of mercury, the movement of the mercury is completed in about 80 hours at the maximum. In this case, the tube temperature at the non-cooling part is 80° C. (that corresponds to the mercury vapor pressure of 11.8 Pa) and the tube temperature at the cooling part is 60° C. (that corresponds to the mercury vapor pressure of 3.35 Pa). In fact, as the tube life is not adversely affected if the movement of the mercury is completed in up to 100 hours, the moving velocity that is 0.8 times the value of the above condition is sufficient. Also, a tube containing mercury the amount of which is 1.5 times the amount of the mercury contained in the tube used in the experiment at the maximum, may exist, but the tube life is not affected if the mercury moves at the moving velocity which is about 1.2 times. Thus, when the tube temperature at the cooling part is fixed at 60° C., the condition of the tube temperature where the vapor pressure difference is 1.2 times is 80° C. (that corresponds to mercury vapor pressure of 8.5 Pa) at the non-cooling part.

For the sake of simplicity, considering the fact that the mercury vapor pressure is proportional to the tube temperature, the expression for giving the moving velocity of the mercury can be approximated as the following expression:

$$v = \alpha \times S \times (T1 - T2) \quad (6)$$

(T1 is the tube temperature at the non-cooling part and T2 is the tube temperature at the cooling part).

As the sufficient velocity can be obtained when the tube internal cross sectional area $S = (0.001)^2 \times \pi$ (m$^2$) and (T1−T2)=15° C., $\alpha$ is obtained from those values and by substituting the obtained value, of $\alpha$ into the equation (6), the required temperature difference with respect to the tube cross sectional area S can be expressed as follows:

$$(T1 - T2) = 20 \times 3.1 \times 10^{-6}/S \quad (7)$$

Next, the difference of the tube temperature between the cooling part and the non-cooling part is defined by using the heat conduction coefficients κ (κ1, κ2) as follows. Here, κ1 is the heat conduction coefficient of air and κ2 is the heat conduction coefficient of the heat conducting member 32:

The tube temperature at the cooling part=$T0+(t/\text{cross sectional area of heat conducting member} \times \kappa 2) \times$ amount of heat produced at heat conducting member (8)

where, T0 is a temperature of the reflector 28 and t is a length of the heat conducting path (a distance between the electric discharge tube 24 and the reflector 28).

The expression (8) can be rewritten by defining physical values as follows:

$$\text{Tube temperature at cooling part} = T0 + W \times L/(k2 \times L)$$
$$= T0 + W/k2 \quad (9)$$

where W is an amount of heat per unit length at the light emitting part of the tube, L is a length of the heat conducting path in the tube longitudinal direction, and k2 path=the cross sectional area of the heat conducting path×κ2/t.

The temperature of the non-cooling part can be also expressed as the following expression, which is similar to (9), by replacing the value of the heat conduction coefficient of the heat conduction member 32 by the heat conduction coefficient of air:

$$\text{Tube temperature at non-cooling part} = T0 + W/k1 \quad (10)$$

As the expression (7) corresponds to the left-hand side of the expression (1), the expressions (9) and (10) can be substituted into the right-hand side of the expression (1).

As the mercury is consumed due to chemical combination with the materials sputtered from the electrodes, the consumption of the mercury can be prevented by collecting the mercury at the cooling part before the sputtered materials of an amount sufficient to be combined with the mercury are emitted and leave the electrodes. The life of the cold-cathode tube changes to a great extent around a tube current of about 10 mA and may become less than 40,000 hours, which is the minimum life typically required for displays. Therefore, the practical conditions can be determined based on the amount of sputtered materials at 10 mA. On the other hand, with regard to the amount of the sputtered materials, when the area covered by the sputtered materials is smaller than the area to which the mercury is adhered, the mercury vapor is always produced and the cold-cathode tube is not deteriorated. (When the mercury droplets are not covered by the sputtered materials completely, the mercury atoms are vaporized successively from the surface that is not covered by the sputtered materials).

In the case of the cold-cathode tube that has a length of about 350 mm and that is filled with about 2 mg of mercury, the total amount of mercury adhered to the wall of the cold-cathode tube occupies the smallest area when it is gathered in a hemispherical manner. At this time, the diameter of the mercury hemisphere is 0.4 mm. Considering the fact that the vaporization of the mercury vapor is stopped when the surface of this mercury droplet is covered by the sputtered materials entirely, the mercury should be collected in an area where the sputtered materials are not dispersed till the sputtered materials are adhered to a range larger than 0.4 mm that is the diameter of the mercury vapor. Thus, the deterioration due to the consumption of the mercury can be prevented by completing the movement of the mercury within 100 hours. Table 1 shows the life of the tube and the deposition of the sputtered materials with respect to the current (the sputtering length is a distance from the tip of the electrode to the tip of the area to which the sputtered materials are adhered).

TABLE 1

| Tube current (mA) | 7 | 10 | 15 | 20 |
|---|---|---|---|---|
| Tube life (h) | 60000 | 32000 | 12800 | 9600 |
| Sputtering length (mm) after a lapse of 100 hours | 0.1 | 0.2 | 0.4 | 0.8 |
| Sputtering length (mm) after a lapse of 200 hours | 0.6 | 0.6 | 0.9 | 1.7 |

Further, the range where the sputtered materials are deposited will be described. The consumption of the mercury can be eliminated by moving the mercury to a position that is farther than this range within the time period mentioned above.

Table 2 shows dependence of the amount of the sputtered materials and the amalgamated mercury on the position where the mercury is collected after the tube is lit up continuously for 4000 hours. Thus, Table 2 shows the dependence of the consumption rate of the mercury on the position where the mercury is collected. From the table, it can be considered that the mercury is not amalgamated in the position that is distant from the tip of the electrode by about 100 mm or more. It can also be thought that the flying distance does not depend on the temperature in the space where the sputtered materials fly because the sputtered materials are not vaporized during the dispersion.

TABLE 2

| Position where mercury is collected (distance from tip of electrode) | 5 mm | 20 mm | 65 mm | 185 mm |
|---|---|---|---|---|
| Degree of Mercury consumption | 22% | 11.6% | 6.2% | 2.5% |

In order to address the third problem, the heat conducting path is made of a material having a heat conductivity that increases as temperature rises so that the heat conductivity of the heat conducting path increases as the ambient temperature rises and, thus, the temperature difference between the heat radiating plate and the electric discharge tube is reduced. Though it is known that the heat conductivity is reduced as temperature rises in typical metals and resins, in the case of brass, bronze and the like, it is also known that the heat conductivity is increased by about 2% as the temperature rises by 10° C.

In order to address the fourth problem, the heat conducting path having a white surface is used.

Here, the present invention will be described in more detail with reference to FIGS. 7 and 8.

Figure 7:
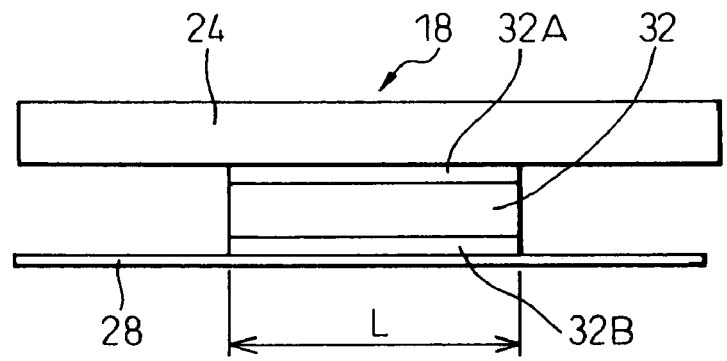
FIG. 7 is a view showing the light source device according to an embodiment of the present invention.
Figure 8:
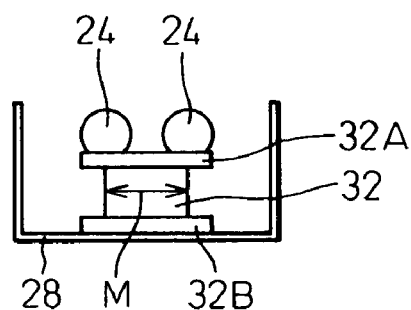
FIG. 8 is a cross-sectional view of the light source device of FIG. 7.

In FIGS. 7 and 8, the electric discharge tubes 24 are in contact with the reflector 28 via the heat conducting member 32. The heat conducting member 32 is coupled to the electric discharge tubes 24 by a heat conducting rubber (adhesive) 32A and is coupled to the reflector 28 by a heat conducting sheet (adhesive) 32B.

Each of the electric discharge tubes 24 used here is a tube that has an entire length of 385 mm and an internal diameter of 2.0 mm and has electrodes made of Nb and, on the other hand, the reflector used here has an entire length of 390 mm and a U-shaped cross section as shown in the figure. In the reflector 28, two electric discharge tubes 24 are disposed and electrically wired in parallel to be lit up.

A heat conducting component that is made of brass and has a shape as shown in the figure is used as the heat conducting member 32. The heat conducting member 32 used here is a brass block that has a thickness of 1.7 mm, a length L of 10 mm in the longitudinal direction of the cold-cathode tube, and a width M of 3 mm in the direction of the row of the two electric discharge tubes 28. The heat conductivity of brass varies from 112.6 W/K/m to 119.2 W/K/m as the ambient temperature varies from 20° C. to 50° C. In the case where the amount of heat transferred between both ends of the heat conducting component is constant, the temperature difference between the both ends can be reduced by 6%.

The heat conducting member 32 is disposed so that it is fitted with the two electric discharge tubes 24 and is also in contact with the surface of the reflector 28. In order to improve thermal contact of the heat conducting member 32 with the reflector 28 and with the electric discharge tubes 24, heat conducting sheets 32A and 32B having a thickness of 0.45 mm (TC-45GB manufactured by Shin-Etsu Chemical Co., Ltd.) are inserted between the heat conducting member 32 and the electric discharge tubes 24 and between the heat conducting member 32 and the reflector 28.

When the ambient temperature is 25° C., if a current of 10 mA per tube is applied to the electric discharge tubes 24 in this light source device, the temperature of the tube wall rises to 60° C. at the part in contact with the heat conducting member 32 (on the other hand, at the part not in contact with the heat conducting member 32, it rises to about 85° C.). When the ambient temperature is 50° C., the heat conductivity of the heat conducting member 32 is increased and, therefore, the temperature at the part in contact with the heat conducting member 32 is only 83° C. (it is reduced by 2 degrees in comparison with the increase of the ambient temperature). As a result, the brightness can be increased by 5% at the ambient temperature of 50° C.

When the electric discharge tubes 24 used here are assembled, the mercury is distributed at unspecified positions in the tubes. Therefore, when this light source device is lit up for the first time, uniform white light emission can be obtained in each of the fluorescent tubes from the beginning of lighting. As the electric discharge tubes 24 are lit up continuously, the mercury is concentrated on the wall at the part in contact with the heat conducting member 32, wherein it took, at the maximum, 86 hours. At this time, the sputtered materials from the electrodes, which are caused by electrons and ions rushing from the discharge space toward the electrodes, are still not adhered to the wall surfaces of the tubes. Thus, chemical combination of the sputtered materials, from the electrodes, with the mercury droplets, which are the main cause of the deterioration of the electric discharge tubes 24, does not occur at this time.

Figure 9:
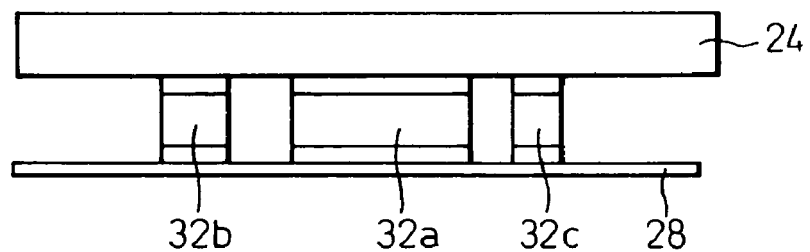
FIG. 9 is a view showing a variation of the light source device of FIGS. 7 and 8.

FIG. 9 is a view showing a variation of the light source device of FIGS. 7 and 8. From the expression (1) described above, the heat conductivity k1 (W/K/m) of the heat conducting member 32 per unit length at the cooling part can be determined. Therefore, the length L of the heat conducting member 32 in FIG. 7 can be determined. The heat conducting member 32 does not always have to have a continuous length L as shown in FIG. 7. Rather, as shown in FIG. 9, the heat conducting member 32 may be divided into members 32$a$, 32$b$ and 32$c$ so that the total length of the members 32$a$, 32$b$ and 32$c$ is the determined length L.

The about 1.5 mg to 5 mg of mercury per internal volume of 1 cm$^3$ is filled in the tube and, even while the tube is lit up, most of the mercury is adhered to the tube wall. When the mercury is adhered to the fluorescent material layer in the fluorescent tube, it takes the shape of hemispheres each of which has a radius of about 0.01 mm. In order to cool all of the mercury, a larger area must be cooled than in the case when the mercury is adhered in a concentrated manner. At this time, the area that has to be cooled can be determined from the area where the mercury is adhered.

In order to ensure the life of the mercury, mercury of, at a minimum, 1.5 V (mg) is filled in the cold-cathode tube having an internal volume of V. Thus, the volume of this mercury can be calculated by the following expression:

$$1.5 \times 10^{-3} \times V/13.5 = 1.1 \times 10^{-4} \times V \text{ (cm}^3\text{)} \qquad (11)$$

When the mercury having this volume coheres in the form of hemisphere droplets, each of which has a radius of 0.01 mm, the volume of each droplet is $2.0 \times 10^{-6}$ (cm$^3$) and the number of the droplets is $5.5 \times 10^2 \times V$. In order that circles having a radius of r are placed in a plane without overlapping, one area of $4r^2$ (cm$^2$) per one circle is required. That is, an area so required for mercury droplets to be adhered to the tube wall without overlapping each other is more than $2.4 \times 10^{-1} \times V$ (cm$^2$) (since there is a case where the amount of mercury is much more.) The temperature of the mercury droplets can be controlled by making the area s to be cooled larger than the area so required for the mercury droplets to be in contact with tube surface, or by satisfying the relationship of the following expression:

$$s > 2.4 \times 10^{-1} V \text{ (cm}^2\text{)} \qquad (12)$$

This expression can be transformed to:

$$V/s < 4.2 \text{ cm} \qquad (13)$$

Here, it is to be noted that a conventional example to use rings of silicone resins and the like for positioning the cold-cathode tube is known but, in this case, the silicone resins are in contact with the cold-cathode tube in an area of only about 0.025 cm$^2$, which is too small to satisfy this relationship.

3 mg of mercury is filled in a fluorescent tube for the liquid crystal backlight having an inner diameter of 2.0 mm and a total length of 350 mm. The 3 mg of mercury has a volume of $2.2 \times 10^{-4}$ cm$^3$. When this mercury coheres as hemisphere droplets each of which has a radius of 0.01 mm, the number of the droplets is about $1.0 \times 10^5$. As the diameter of one droplet is 0.02 mm, the droplets need an area of 0.4 cm$^2$ to adhere uniformly.

Thus, according to this embodiment, in a cold-cathode tube having an inside diameter of 2.0 mm and a total length of 370 mm (an internal volume of $1.2 \times 10^{-3}$ cm$^3$), the total contact area of 0.4 cm$^2$ can be secured by providing a white heat-conducting silicone resin, which has a width of 7 mm in the vicinity of its center and further ones which have a width of 4 mm and centered on a point distant from the electrode by 30 mm, and they are bought into contact with a range of ¼ (corresponding to 0.16 cm of the inner surface) of the circumference of the cold-cathode tube.

In this case, the light source device according to one aspect of the present invention at least includes a mercury electric discharge tubes and more than one heat conducting path, wherein the electric discharge tube is made of a transparent material and has electrodes provided at both ends thereof, one end of each of the heat conducting paths is in contact with a part of a tube wall within a light emitting portion of the electric discharge tube, and a surface area s of the cold cathode tube in the range where it is in contact with the heat conducting paths and an internal volume V (m$^3$) of the electric discharge tube satisfy the relationship, V/s<4.2 cm.

Figure 10:
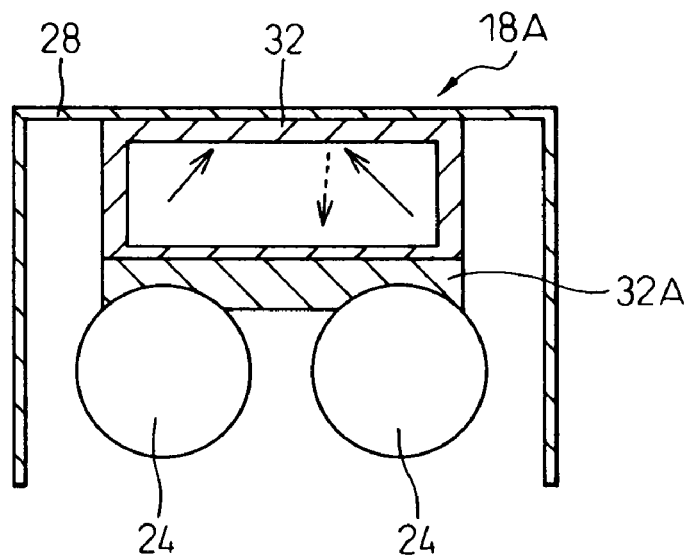
FIG. 10 is a view showing a portion of another embodiment.
Figure 11:
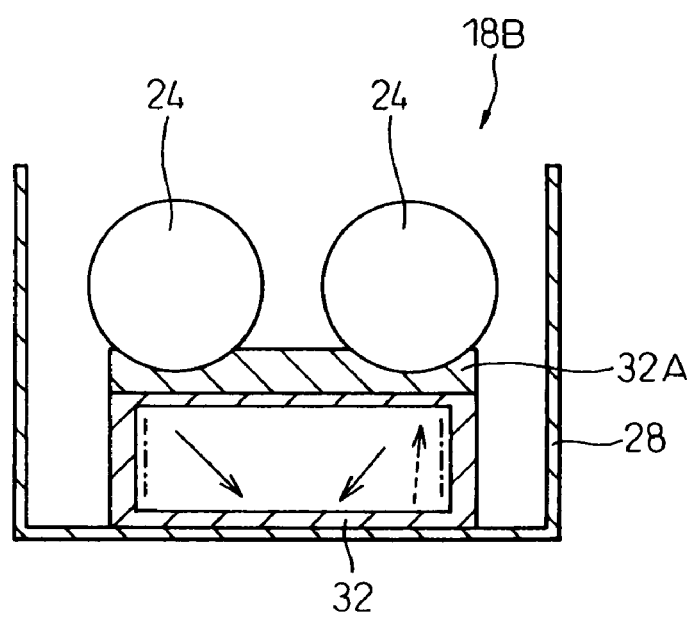
FIG. 11 is a view showing the other portion of the embodiment of FIG. 10.

FIGS. 10 and 11 are views showing another embodiment.

In FIGS. 10 and 11, electric discharge tubes 24, each of which has an inside diameter of 2.0 mm and a tube length of 385 mm, are used in a configuration where the two electric discharge tubes 24 are surrounded by one reflector 28.

When the light source device is used in a monitor, two sets of the light source devices are disposed on the upper side and on the lower side of a light guide plate. It is necessary to manufacture the light source device 18A that is disposed on the upper side and the light source device 18B that is disposed on the lower side.

First, in the light source device 18A, a thermosyphon device as described below is disposed between the reflector 28 and the electric discharge tubes 24 as a heat conducting path 32. A case that is made of a stainless steel plate of 0.5 mm thickness and has a height of 2.5 mm is once evacuated and then filled with methyl alcohol. Then, a silicone resin 32A is attached to one side of the case and is shaped as shown in the figure so that it can be in close contact with the electric discharge tubes 24. As the electric discharge tubes 24 are located on the underside of the thermosyphon device, it heats the methyl alcohol accumulated on the bottom side of the stainless steel case. When the temperature of the tubes reaches the optimal temperature described above (65° C.), the methyl alcohol boils and rapidly evaporates upward (as shown by solid lines). When the methyl alcohol vapor comes into contact with the top side of the stainless steel case that is, in turn, in contact with the reflector, it condenses. The resultant droplets of methyl alcohol return to the bottom side due to gravity (as shown by a broken line). Thus, a heat cycle is formed to conduct heat from the electric discharge tubes 24 to the reflector 28.

Next, in the light source device 18B, as the droplets of methyl alcohol condense on the bottom side due to gravity, stainless steel meshes are attached to the lateral sides of the case so as to deliver the methyl alcohol to the upper part that is in contact with the electric discharge tubes 24. Further, outside surfaces of the stainless steel cases are painted white so as to prevent color unevenness. In this embodiment, the solid line indicates movement of vapors while the broken line indicates movement of droplets.

Figure 12:
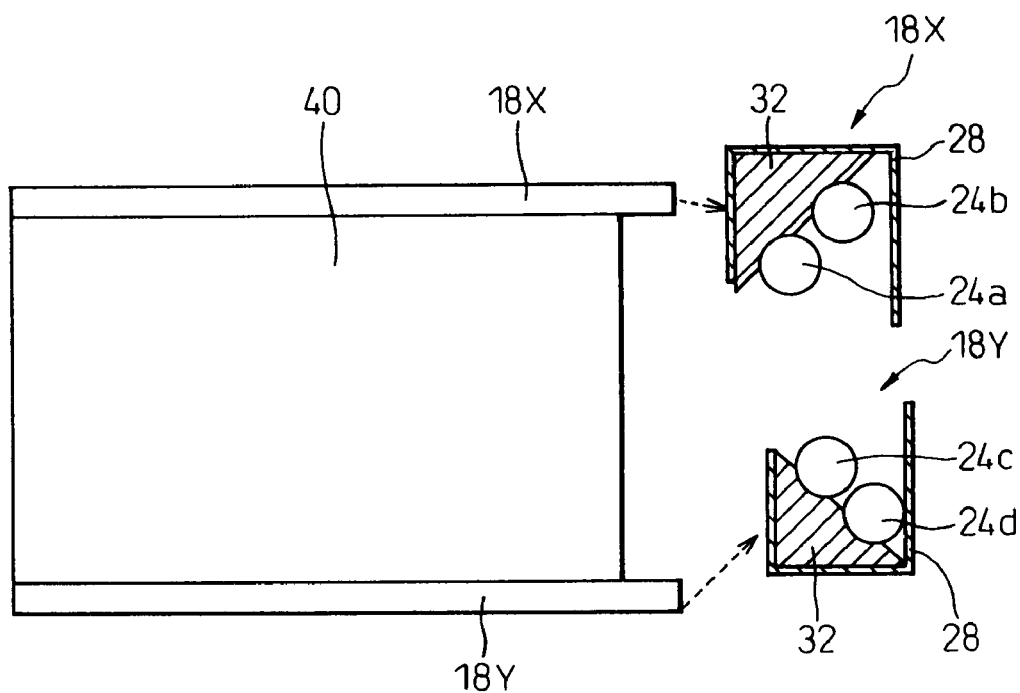
FIG. 12 is a view showing yet another embodiment.

FIG. 12 is a view showing yet another embodiment.

In FIG. 12, lamp assemblies 18X and 18Y, each of which is configured by enclosing two of electric discharge tubes 24a–24d with one of reflectors 28, are disposed on the top and bottom side of a vertically placed light guide plate 40 so that each one set (2 sets in total) is opposed to the light guide plate 40. Temperature values of light emitting parts of the electric discharge tubes 24a–24d without cooling are shown in the table below. The tube surface temperature values of the upper and lower sets differ from each other by about 7° C. Therefore, even when identical heat conducting members (rubber spacers for cooling) 32 are attached to the electric discharge tubes 24, a similar temperature difference remains (the surface temperature when the heat conducting members are made of a material having heat conductivity of 1.2 W/K/m is shown in the table). With respect to the variation of the tube surface temperature, the brightness varies at the rate of 0.6%/° C. As a result, the temperature difference of 4° C. between the upper and lower sets is generated, which may result in a brightness gradient of 2%. Therefore, the heat conducting members 32 of different materials are used for each of the upper and lower lamp assembly sets 18X and 18Y. When the heat conducting member 32 in the upper set has heat conductivity of 1.2 W/K/m and the heat conducting member 32 in the lower set has heat conductivity of 1.4 W/K/m, the temperature difference between the upper and lower tubes can be reduced to within 2° C. as shown in the right side of the table below and, thus, the brightness gradient in the vertical direction can be reduced to about 1%.

TABLE 3

| Discharge Tube | Tube Surface Temperature (without cooling) | Tube Surface Temperature (with identical cooling rubbers) | Tube Surface Temperature in embodiment (with combination cooling rubbers) |
|---|---|---|---|
| 24a | 93° C. | 70° C. | 70° C. |
| 24b | 86° C. | 65° C. | 65° C. |
| 24c | 87° C. | 66° C. | 72° C. |
| 24d | 81° C. | 61° C. | 67° C. |

Figure 13:
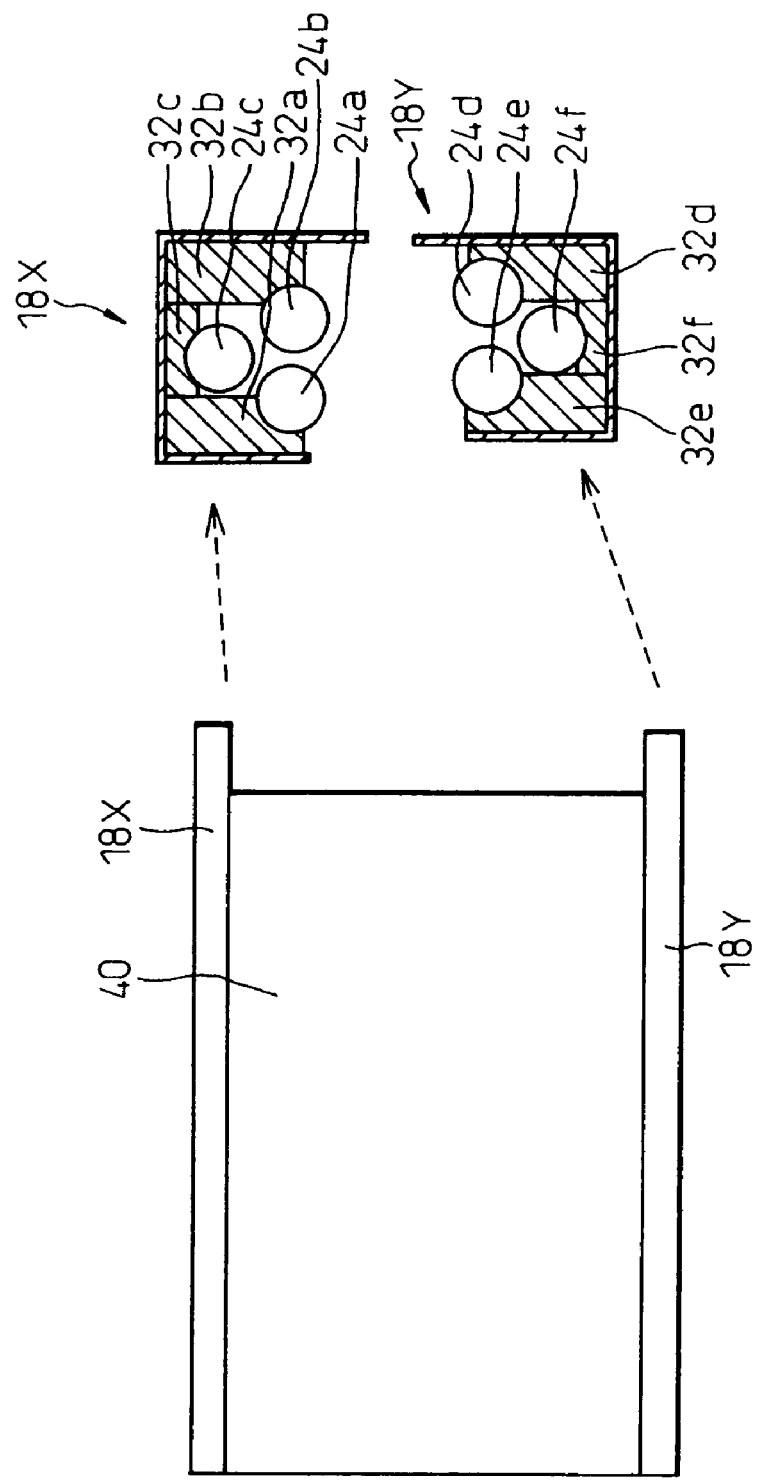
FIG. 13 is a view showing yet another embodiment.

FIG. 13 is a view showing yet another embodiment.

In FIG. 13, lamp assemblies 18X and 18Y, each of which is configured by enclosing three of electric discharge tubes 24a–24f with one of reflectors 28, are disposed on the top and bottom side of a vertically placed light guide plate 40 so that each one set (2 sets in total) is opposed to the light guide plate 40. In each set, a temperature difference of about 25° C. between two electric discharge tubes 24a, 24b, 24d, 24e that face the opening of the reflector 28 and the remaining one electric discharge tube 24c, 24f is produced. Therefore, a material having higher heat conductivity is used for rubber spacers 32c and 32f for cooling that are in contact with the tubes 24c and 24f,respectively. The rubber spacer for cooling used in the upper set 18X is formed by hot-pressing one material having heat conductivity of 2.0 W/m/K as the heat conducting member 32c and another material having heat conductivity of 1.6 W/m/K as the heat conducting members 32a and 32b together. On the other hand, the rubber spacer for cooling used in the lower set 18Y is formed by hot-pressing one material having heat conductivity of 1.6 W/m/K as the heat conducting member 32f and another material having heat conductivity of 1.2 W/m/K as the heat conducting members 32d and 32e together. As a result, the difference of the coldest point temperature of the tubes between the upper and lower lamp assembly sets can be reduced to within 5° C. and, therefore, a brightness gradient is scarcely produced. On the other hand, the temperature values differ between the cold-cathode tubes in each lamp assembly by at the maximum about 10° C. Considering the above, as shown in the figure, the temperature dependence of the brightness can be reduced in comparison with the case in which the coldest points of all the cold-cathode tubes are made even and, at the same time, the brightness in ambient temperature can be increased in comparison with the case in which rubber spacers for cooling of an identical material are attached to all the cold-cathode tubes (In the conventional backlight, as the temperature difference between tubes in an assembly is larger than 10° C. (about 20° C.), the highest brightness of the backlight would be reduced. Though the highest brightness can further be increased by 2% by reducing the temperature difference between the tubes in the assembly, it is not practical because its temperature characteristics become too intense).

TABLE 4

| Electric discharge tube | Tube surface temperature (without cooling) | Tube surface temperature |
|---|---|---|
| 24a | 92° C. | 65° C. |
| 24b | 90° C. | 64° C. |
| 24c | 115° C. | 76° C. |
| 24d | 82° C. | 64° C. |
| 24e | 83° C. | 63° C. |
| 24f | 104° C. | 74° C. |

Figure 14:
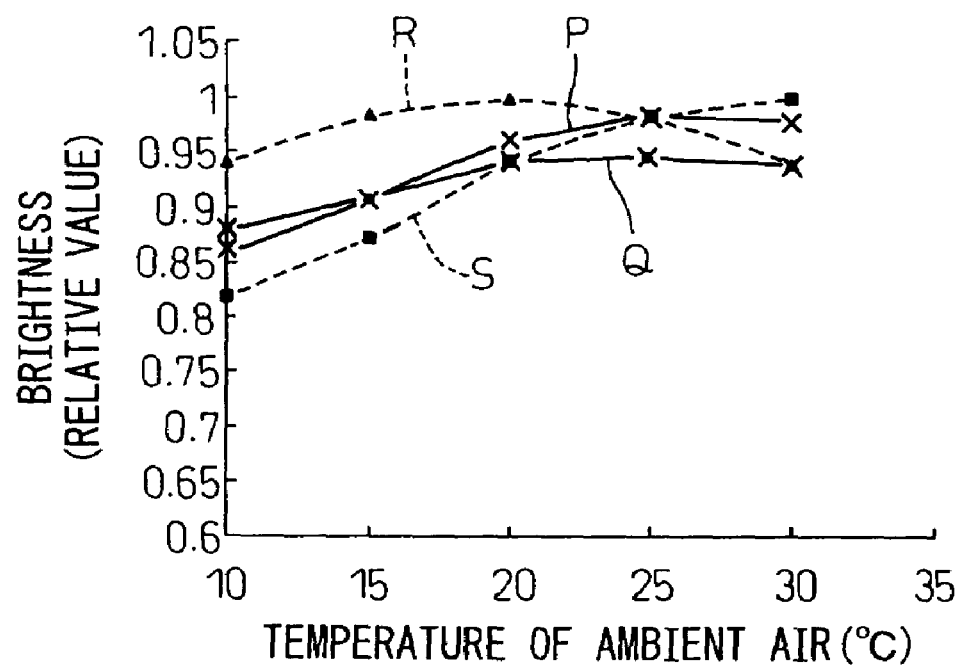
FIG. 14 is a view showing the relationship between the temperature of ambient air and the brightness of the light source device of FIG. 13.

FIG. 14 is a view showing a relationship between temperature of ambient air and brightness (relative values) of the light source device of FIG. 13. A curve P indicates the brightness of the light source device according to this embodiment. A curve Q indicates the brightness of the light source device in which all heat conducting members have identical heat conductivity. A curve R indicates the brightness of the electric discharge tubes 24a and 24b. A curve S indicates the brightness of the electric discharge tube 24c.

As described above, according to the present invention, light source device having a high light-emitting efficiency can be provided.

The invention claimed is:

1. A light source device comprising:
an electric discharge tube containing mercury therein and having electrodes at both ends thereof; and a heat conducting path in contact with a part of said electric discharge tube;

wherein the following relationship is substantially satisfied:

$$6\times10^{-5}(m^2 \cdot k)/S < (1/k1 - 1/k2)W \qquad (1)$$

where a part of said electric discharge tube in contact with said heat conducting path is defined as a cooling part, a part of said electric discharge tube not in contact with said heat conducting path is defined as a non-cooling part, a cross sectional area of the interior of the electric discharge tube is defined as S ($m^2$), an amount of generated heat per unit length of said electric discharge tube is defined as W (W/m), heat conductivity from inside to outside of the tubes per unit length in the longitudinal direction of said non-cooling part is defined as k1 (W/K/m), and heat conductivity from inside to outside of the tubes per unit length in the longitudinal direction of said cooling part is defined as k2 (W/K/m).

2. The light source device according to claim 1, wherein the heat conducting path is in contact with a part of said electric discharge tube and the other end of said heat conducting path is in contact with a heat radiator.

3. A light source device including:

at least one electric discharge tube;

a heat conducting path; and a heat radiator;

wherein the electric discharge tube is filled with a solid or liquid light emitting material which vaporizes when the electric discharge tube is energized, said heat conducting path is made of a material or a structure having a heat conductivity that increases as ambient temperature rises, and one end of the heat conducting path is in contact with a part of a wall of the electric discharge tube and the other end of the heat conducting path is disposed in contact with the heat radiator.

4. A light source device including:

at least one electric discharge tube;

a heat conducting path; and a heat radiator;

wherein the electric discharge tube is filled with a solid or liquid light emitting material which vaporizes when the electric discharge tube is energized, said heat conducting path is made of a material or a structure having a heat conductivity that increases as ambient temperature rises, and one end of the heat conducting path is in contact with a part of a wall of the electric discharge tube and the other end of the heat conducting path is disposed in contact with the heat radiator;

wherein said electric discharge tube is filled with mercury and said heat conducting path material or structure heat conductivity changes abruptly as ambient temperature is around 60° C.–80° C.

5. A light source device comprising:

at least one electric discharge tube;

a solid heat conducting path; and a heat radiator;

wherein the electric discharge tube is filled with a solid or liquid light emitting material which vaporizes when the electric discharge tube is energized, and wherein said heat conducting path has a white surface or light-colored surface, and one end of the heat conducting path is in contact with a part of a wall of the electric discharge tube and the other end of the heat conducting path is disposed in contact with the heat radiator.

6. A light source device comprising:

a plurality of light source assemblies, each of which includes at least one electric discharge tube, a heat conducting path and a heat radiator;

wherein each electric discharge tube is filled with a solid or liquid light emitting material which vaporizes when the electric discharge tube is energized, each of the heat conducting paths is disposed, with respect to the respective electric discharge tube, so that one end of the heat conducting path is in contact with a surface of the electric discharge tube and the other end is not in contact with the electric discharge tube but is in contact with the heat radiator, and wherein the heat conducting paths have different heat conductivities for every light source assembly, and surface temperatures of the electric discharge tubes at parts in contact with the respective heat conducting paths in the respective light source assemblies remains substantially within a range of 5° C.

7. A light source device comprising:

an electric discharge tube containing mercury therein; and a solid heat conducting path, wherein said electric discharge tube is made of a transparent material and has electrodes provided at both ends thereof, one end of said heat conducting path is in contact with a part of a wall of the electric discharge tube within a light emitting portion, and a surface area s ($m^2$) of the electric discharge tube in the range where it is in contact with said heat conducting path and an internal volume V ($m^3$) of the electric discharge tube satisfies the relationship V/s<4.2 cm and one end of said heat conducting path is in contact with a part of a wall of the electric discharge tube within a light-emitting portion, so as to produce a temperature difference along an axial direction of the electric discharge tube.

* * * * *